(12) United States Patent
Han et al.

(10) Patent No.: US 11,339,069 B2
(45) Date of Patent: May 24, 2022

(54) ANAEROBIC AMMOXIDATION SYNERGISTIC NITROGEN REMOVAL PROCESS DEVICE OF MUNICIPAL SEWAGE MAIN AND SIDE STREAMS AND APPLICATION METHOD THEREOF

(71) Applicants: BEIJING DRAINAGE GROUP CO., LTD, Beijing (CN); BEIJING DRAINAGE TECHNOLOGY CO., LTD, Beijing (CN)

(72) Inventors: Xiaoyu Han, Beijing (CN); Shujun Zhang, Beijing (CN); Dan Zhao, Beijing (CN); Jiawei Wang, Beijing (CN); Yong Jiang, Beijing (CN); Jing Huang, Beijing (CN); Gangxin Chen, Beijing (CN)

(73) Assignees: BEIJING DRAINAGE GROUP CO., LTD, Beijing (CN); BEIJING DRAINAGE TECHNOLOGY CO., LTD, Beijing (CN)

( * ) Notice: Subject to any disclaimer, the term of this patent is extended or adjusted under 35 U.S.C. 154(b) by 55 days.

(21) Appl. No.: 16/966,655

(22) PCT Filed: Sep. 23, 2019

(86) PCT No.: PCT/CN2019/107356
§ 371 (c)(1),
(2) Date: Jul. 31, 2020

(87) PCT Pub. No.: WO2020/119217
PCT Pub. Date: Jun. 18, 2020

(65) Prior Publication Data
US 2020/0354247 A1 Nov. 12, 2020

(30) Foreign Application Priority Data
Dec. 10, 2018 (CN) .......................... 201811504934.3

(51) Int. Cl.
*C02F 3/30* (2006.01)
*C02F 1/00* (2006.01)
(Continued)

(52) U.S. Cl.
CPC ................ *C02F 3/303* (2013.01); *C02F 1/00* (2013.01); *C02F 3/006* (2013.01); *C02F 3/1284* (2013.01);
(Continued)

(58) Field of Classification Search
CPC ...... C02F 3/307; C02F 2101/16; C02F 11/04; C02F 3/303; C02F 11/02; C02F 2001/007; C02F 3/28; C02F 3/2806; C02F 9/00
(Continued)

(56) References Cited

FOREIGN PATENT DOCUMENTS

| CN | 201923925 U | * | 8/2011 |
| CN | 105217890 A | * | 1/2016 |

OTHER PUBLICATIONS

CN105217890, Li et al, English Machine Translation, pp. 1-6 (Year: 2016).*
(Continued)

*Primary Examiner* — Claire A Norris
(74) *Attorney, Agent, or Firm* — Browdy and Neimark, P.L.L.C.

(57) ABSTRACT

Provided are an anaerobic ammoxidation synergistic nitrogen removal process device of municipal sewage main and side streams and an application method thereof, comprising a municipal sewage raw water tank (1), a biological reaction pool (2), a secondary sedimentation pool (3), a sludge digestion solution raw water tank (4) and a sludge digestion solution AOB strengthening pool (5); wherein, the municipal sewage raw water tank (1) is connected with a water inlet valve (2.2) of the biological reaction pool (2) through a water inlet pump (2.1) of the biological reaction pool (2); the biological reaction pool (2) is connected with the secondary sedimentation pool (3) through a secondary sedimentation pool connection pipe (3.3); the sludge digestion solution raw water tank (4) is connected with a water outlet valve (4.1) of the sludge digestion solution raw water tank (4) through a water inlet pump (4.2) of the sludge digestion solution raw
(Continued)

water tank (4); the sludge digestion solution AOB strengthening pool (5) is connected with an anaerobic ammoxidation region compartment of the biological reaction pool through a sludge-water mixture reflux pipe (5.8) and a sludge-water mixture reflux pump (5.11). It has the advantages of reasonability in structure design, convenience in operation, low running and maintenance cost, relatively low energy consumption, no need of an additional carbon source and the like, it can realize that short distance nitrification of municipal sewage is more stable, and it is high in low-temperature, water quantity and water quality shock resistance and can further increase volumetric load at the same time.

3 Claims, 1 Drawing Sheet

(51) Int. Cl.
  *C02F 3/00* (2006.01)
  *C02F 3/12* (2006.01)
  *C02F 101/16* (2006.01)

(52) U.S. Cl.
  CPC .... *C02F 2001/007* (2013.01); *C02F 2101/16* (2013.01); *C02F 2209/008* (2013.01); *C02F 2209/02* (2013.01); *C02F 2209/06* (2013.01); *C02F 2209/14* (2013.01); *C02F 2209/22* (2013.01); *C02F 2209/38* (2013.01)

(58) Field of Classification Search
  USPC .................................................. 210/903, 613
  See application file for complete search history.

(56) References Cited

OTHER PUBLICATIONS

CN2019217890, Ma et al, English Machine Translation, pp. 1-6 (Year: 2011).*

* cited by examiner

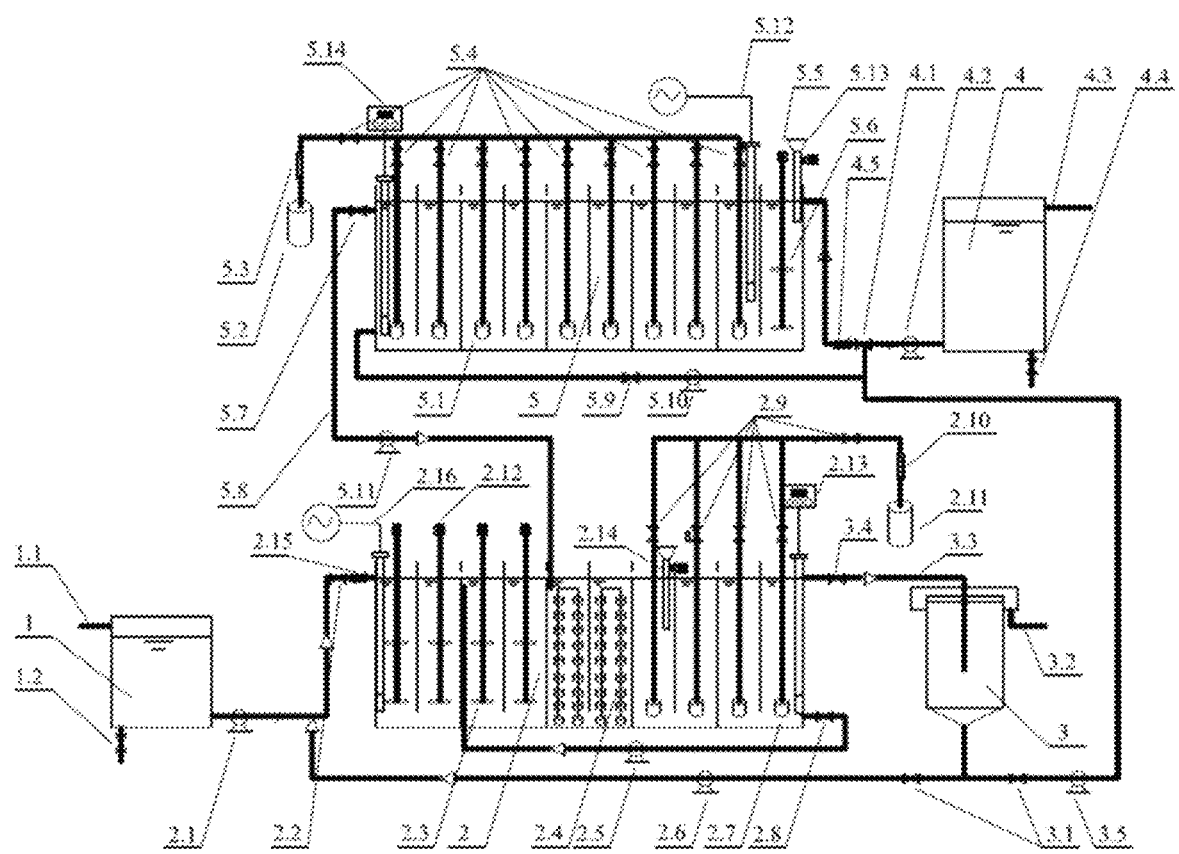

US 11,339,069 B2

ANAEROBIC AMMOXIDATION SYNERGISTIC NITROGEN REMOVAL PROCESS DEVICE OF MUNICIPAL SEWAGE MAIN AND SIDE STREAMS AND APPLICATION METHOD THEREOF

TECHNICAL FIELD

The present disclosure relates to the technical field of municipal sewage treatment, and in particular to an anaerobic ammoxidation synergistic nitrogen removal process device of municipal sewage main and side streams and application method thereof.

BACKGROUND

China is imposing more and more strict requirements on the nitrogen content in the effluent from the municipal sewage treatment plant and particularly on the total nitrogen (TN) concentration in the effluent. The traditional biological nitrogen removal technologies are to remove the nitrogen by means of nitrifying bacteria and denitrifying bacteria, and the sufficient carbon sources serve as a key of the efficient nitrogen removal in denitrifying denitrification. When the raw water has a relatively low carbon/nitrogen ratio, the requirement of the denitrification on organic carbon sources cannot be met, and a large amount of external carbon sources are necessarily added, thereby ensuring that the biological nitrogen removal effect reaches the national class-A discharge standard.

The emergence of the theory of short-cut nitrification and denitrification and short-cut nitrification anaerobic ammoxidation denitrification provides new ideas for reducing the amount of carbon source added and reducing the cost of sewage treatment.

The short-cut nitrification is merely to oxidize the ammonia nitrogen into the nitrogen nitrite, such that the short-cut nitrification and denitrification reduce the carbon resources required by the process when the $NO_3^-$ is reduced to the $NO_2^-$, and 40% of carbon sources may be saved. Moreover, 25% of aeration amount may further be saved. The denitrification rate of the nitrite is 1.5-2 times of that of the nitrate, thereby reducing the emission amount of $CO_2$ by 20%, reducing the amount of sludge by 33-35% during nitrification and reducing the amount of sludge by 55% during denitrification.

The anaerobic ammonia oxidizing bacteria can take the nitrite as the electron acceptor in hypoxic conditions to convert the ammonia nitrogen into nitrogen gas. Compared with the traditional nitrification and denitrification process, the nitrogen removal process based on the anaerobic ammoxidation can save 62.5% of oxygen theoretically, no carbon source is needed, less residual sludge is produced due to slow growth of the autotrophic bacteria, and discharges less $CO_2$ (the autotrophic bacteria use the $CO_2$ as the carbon source), thereby being a more sustainable nitrogen removal process.

Nevertheless, how to realize the application of the short-cut nitrification anaerobic ammoxidation of the municipal sewage in mainstream process of sewage treatment and the stable operation of the short-cut nitrification of the municipal sewage in continuous reactors are still the currently acknowledged problems. The present disclosure is just proposed based on the above research background, and is intended to improve the short-cut nitrification efficiency and the total nitrogen volumetric load, and enhance the low-temperature impact resistance of the system.

SUMMARY

An objective of the present disclosure is to provide an anaerobic ammoxidation synergistic nitrogen removal process device of municipal sewage main and side streams and application method thereof, to overcome the above defects of the short-cut nitrification anaerobic ammoxidation application of the municipal sewage in the prior art. It has the advantages of reasonability in structure design, convenience in operation, low running and maintenance cost, relatively low energy consumption, no need of an additional carbon source and the like, it can realize that short distance nitrification of municipal sewage is more stable, and it is high in low-temperature resistance, water quantity and water quality impact capability and can further increase volumetric load at the same time.

In order to achieve the above objective, the present disclosure is implemented using the following technical solutions:

An anaerobic ammoxidation synergistic nitrogen removal process device of municipal sewage main and side streams, the device includes a municipal sewage raw water tank, a biological reaction pool and a secondary sedimentation pool; a side stream process of sewage treatment is provided with a sludge digestion solution raw water tank and an AOB strengthening pool; the municipal sewage raw water tank is an open box and is provided with an overflow pipe and a blow-down pipe; the municipal sewage raw water tank is connected to a water inlet valve of the biological reaction pool through a water inlet pump; the biological reaction pool is an open pool, which is divided into a plurality of compartments, and is provided with overflowing holes in an up-and-down staggered manner as per a water flow direction to connect each compartment; a front end of the biological reaction pool is respectively provided with compartments of an anaerobic region and compartments of an anoxic region; both of the compartments of the anaerobic region and the compartments of the anoxic region are provided with stirrers and stirring paddles; adjacently, the biological reaction pool is provided with compartments of an anaerobic ammoxidation region, where a fixed filler is inoculated, the fixed filler is a polyethylene (PE) filler and a PE sponge combined filler ball; a rear end of the biological reaction pool is provided with compartments of an aerobic region, where an aeration head is provided; an air compressor is connected, through a gas flowmeter and a gas flow regulation valve, to the aeration head disposed on a bottom of the reaction pool; a last compartment of the aerobic region reflows a sludge-water mixture to the anoxic region of the biological reaction pool through an internal reflux pump; the biological reaction pool is connected to the secondary sedimentation pool through a secondary sedimentation pool connection pipe; the secondary sedimentation pool is a radial-flow sedimentation pool; the sedimentation pool is connected to the water inlet valve of the biological reaction pool through a sludge reflux pump, and connected to a water inlet valve of the AOB strengthening pool through a sludge pump; the sludge digestion solution raw water tank is an open box, and is provided with an overflow pipe and a blow-down pipe; the sludge digestion solution raw water tank is connected to a water inlet valve of a sludge digestion solution AOB strengthening pool through a water inlet pump; the sludge digestion solution AOB strengthening pool is an open pool, which is divided into a plurality of compartments, and is provided with overflowing holes in an up-and-down staggered manner as per the water flow direction to connect each compartment; a front end of the sludge digestion solution AOB strengthening pool is provided with compartments of an anoxic region; the compartments of anoxic region is provided with stirrers and stirring paddles; a rear end of the sludge digestion solution AOB strengthening pool is provided with compartments of an aerobic region, where an aeration head is provided; an air compressor is connected, through a gas flowmeter and a gas flow regulation valve, to the aeration head disposed on a bottom of a reactor; the last compartment of the aerobic region is connected to the water inlet valve of the sludge digestion solution AOB strengthening pool through an internal reflux pump; and the AOB strengthening pool is connected to the anaerobic ammoxidation region of the biological pool through a pipeline and a sludge-water mixture reflux pump.

As a further optimization of the above solutions, the device is further provided with an automatic control assembly; the automatic control assembly includes online detector assembly, a programmable logic controller (PLC), and alkali liquor adding regulators; the online detector assembly are in data signal connection with the programmable PLC controller; the programmable PLC controller is in control connection with the alkali liquor adding regulators; the gas flowmeters are respectively in data signal connection with the programmable PLC controller; the programmable PLC controller is respectively in control connection with the gas flow regulation valves; the liquid flowmeters are respectively in data signal connection with the programmable PLC controller; the programmable PLC controller is in control connection with the water inlet valves; the automatic control assembly further includes heating rods, a temperature sensor and a temperature regulator that are disposed in the reaction pool; the temperature sensor is in data signal connection with the programmable PLC controller; the heating rods are connected to the temperature regulator; the programmable PLC controller is in control connection with the temperature regulator; the online detector assembly includes a dissolved oxygen concentration online detector, an ammonia nitrogen concentration online detector and a pH online detector that are in data signal connection with the programmable PLC controller; the automatic control assembly further includes a wireless transceiver connected to the programmable PLC controller; the wireless transceiver is in communication connection with a cloud server through a wireless network; and the cloud server is connected to a remote monitoring center or an intelligent mobile terminal through the wireless network.

A method for implementing anaerobic ammoxidation synergistic nitrogen removal of main and side streams process by using the anaerobic ammoxidation synergistic nitrogen removal process device of municipal sewage main and side streams provided by the present disclosure includes the following steps:

1) activated sludge with nitrification which is taken from an aeration pool of a municipal sewage plant is added to the biological reaction pool and the municipal sewage secondary sedimentation pool, and a fixed filler adhered with an anaerobic ammonia-oxidizing bacteria is inoculated to an anaerobic ammoxidation region of the biological reaction pool, the activated sludge having a concentration MLSS of 3000-4000 mg/L after the sludge is inoculated; municipal sewage raw water is added to the raw water tank and the water inlet pump is started, such that the raw water enters the biological reaction pool through the water inlet valve of the municipal sewage biological reaction pool; stirrers and air compressors in anaerobic and anoxic regions are started, each compartment in an aerobic region having an aeration amount of 30-50 mL/min, and stirrers in the anaerobic region and the anoxic region having a rotational speed of 90-110 r/min, and the gas flow regulation valve is regulated such that dissolved oxygen DO in the aerobic region is 0.3-0.8 mg/L; the municipal sewage sludge reflux pump and the internal reflux pump are started, a sludge reflux ratio being 50-100%, and an internal reflux ratio being 100-300%; a heating rod is switched on, in order to control the temperature of a mixed solution in the reaction pool of the device at 30-35° C.; an alkali liquor adding regulator is switched on, in order to control the pH value of the device at 7.8-8.3;

2) activated sludge with nitrification which is taken from the aeration pool of the municipal sewage plant is added to the sludge digestion solution AOB strengthening pool, the activated sludge having a concentration MLSS of 3000-4000 mg/L after the sludge is inoculated; a sludge digestion solution is added to the raw water tank and the water inlet pump is started, such that the sludge digestion solution enters the AOB strengthening pool through the water inlet valve of the sludge digestion solution AOB strengthening pool; the stirrers and the air compressors in an anoxic region are started, each compartment in an aerobic region having an aeration amount of 30-50 mL/min, and the stirrers in the anoxic region having a rotational speed of 90-110 r/min, and regulating the gas flow regulation valve such that dissolved oxygen DO in the aerobic region is 0.5-1.0 mg/L; in case of COD>60 mg/L in water of the anoxic region, the sludge digestion solution internal reflux pump is started, the internal reflux ratio being 50-250%; a heating rod is switched on, in order to control the temperature of the mixed solution in the reaction pool of the device at 30-35° C.; and an alkali liquor adding regulator is switched on, in order to control the pH value of the device at 7.8-8.3;

3) the sludge-water mixture reflux pump is switched on, and the sludge-water mixture generated by the sludge digestion solution AOB strengthening pool is added to the anaerobic ammoxidation region of the biological reaction pool;

4) according to the water quality of the sludge digestion solution, and the pH value and temperature of the mixed solution in the sludge digestion solution AOB strengthening pool, a $NH_4^+$—N load of inflow is regulated, i.e., the water inflow is regulated and the sludge reflux ratio is changed, in case of the concentration of free ammonia (FA) is high, the sludge reflux ratio is increased, and in case of the concentration of free nitrite acid (FNA) is high, the sludge reflux ratio is reduced;

5) a $NH_4^+$—N concentration of effluent of the sludge digestion solution AOB strengthening pool is maintained to be smaller than 30 mg/L, and in a case where the $NH_4^+$—N concentration of the effluent is greater than 30 mg/L, the $NH_4^+$—N concentration of the effluent is reduced by increasing a hydraulic retention time (HRT), i.e., reducing the water inflow.

The technical principles of the present disclosure lie in: the device and the method realize the short-cut nitrification of the ammonia nitrogen in the sludge digestion solution by the low DO, inhibiting FA and FNA in the side stream process, i.e., the increase rate of the AOB is greater than that of the nitrite-oxidizing bacteria (NOB), such that the NOB is washed off continuously. Meanwhile, the sludge digestion solution is high-ammonia-nitrogen wastewater, and the AOB amount in a unit of sludge in the sludge digestion solution AOB strengthening system is far greater than that in a unit of sludge in the municipal sewage biological reaction system. Therefore, by adding the sludge-water mixture generated by the sludge digestion solution AOB strengthening system to the municipal sewage biological reaction pool, the AOB amount in the unit of sludge is increased, thereby strengthening the short-cut nitrification efficiency, improving the nitrification volumetric load, and enhancing the low-temperature impact resistance of the system. Additionally, the AOB strengthening system oxidizes the ammonia nitrogen in the sludge digestion solution into the nitrogen nitrite. By adding the sludge-water mixture generated by the sludge digestion solution AOB strengthening system to the municipal sewage biological reaction pool, the ammonia nitrogen and the nitrogen nitrite in the sludge digestion solution and the municipal sewage can be removed simultaneously by the use of the anaerobic ammoxidation and the denitrification in the mainstream sewage treatment system, and the nitrogen in the digestion solution and the municipal sewage is treated more effectively.

By using the anaerobic ammoxidation synergistic nitrogen removal process device of municipal sewage main and side streams and application method thereof, the following beneficial effects are achieved:

1) By adding the high-AOB sludge generated by the sidestream process to the biological reaction pool, the amount of AOB in the unit of sludge in the reactor is increased, and thus the short-cut nitrification of the municipal sewage is more stable, and the ability of resistances to the low temperature, water amount and water quality impact are stronger. Moreover, by virtue of the increased AOB in the unit of sludge in the biological reaction pool, the short-cut nitrification rate of the system is increased, and the volumetric load is increased.

2) The sludge digestion solution having the high concentration of ammonia nitrogen is treated in the sidestream process. With the high ammonia nitrogen load, the short-cut nitrification rate of the system is higher; and by inhibiting the FA and the FNA, the short-cut nitrification is implemented and maintained more easily.

3) The process has the intrinsic characteristics of the short-cut nitrification and denitrification, and the short-cut nitrification anaerobic ammoxidation: the oxygen consumption is less and the energy consumption is reduced; the amount of carbon resources required by the denitrification is reduced, a part of nitrogen elements are removed through the anaerobic ammoxidation reaction, the additional added carbon sources are unnecessarily, and the process is more advantageous to the sewage nitrogen removal lacking in the carbon sources; and the sludge yield is less, and both the sludge disposal cost and the operation cost are reduced.

BRIEF DESCRIPTION OF THE DRAWINGS

FIG. 1 illustrates a structural schematic diagram of an anaerobic ammoxidation synergistic nitrogen removal process device of municipal sewage main and side streams according to the present disclosure.

The numerals in FIG. 1 have the following meaning:

1—municipal sewage raw water tank; 2—biological reaction pool; 3—municipal sewage secondary sedimentation pool; 4—sludge digestion solution raw water tank; 5—sludge digestion solution AOB strengthening pool; 1.1—overflow pipe; 1.2—blow-down pipe; 2.1—water inlet pump; 2.2—water inlet valve; 2.3—stirring paddle; 2.4—fixed filler; 2.5—internal reflux pump; 2.6—sludge reflux pump; 2.7—aeration head; 2.8—reflux valve; 2.9—gas flow regulation valve; 2.10—gas flowmeter; 2.11—air compressor; 2.12—stirrer; 2.13—online detector assembly; 2.14—alkali liquor adding regulator; 2.15—liquid flowmeter; 2.16—heating rod; 3.1—sludge valve; 3.2—drainage pipe; 3.3—biological reaction pool and secondary sedimentation pool connection pipe; 3.4—water outlet valve of biological reaction pool; 3.5—sludge pump; 4.1—water outlet valve of digestion solution raw water tank; 4.2—water inlet pump; 4.3—overflow pipe; 4.4—blow-down pipe; 4.5—liquid flowmeter; 5.1—aeration head; 5.2—air compressor; 5.3—gas flowmeter; 5.4—gas flow regulation valve; 5.5—stirrer; 5.6—stirring paddle; 5.7—sludge—water mixture reflux valve; 5.8—sludge—water mixture reflux pipe; 5.9—sludge internal reflux valve; 5.10—sludge internal reflux pump; 5.11—sludge—water mixture reflux pump; 5.12—heating rod; 5.13—alkali liquor adding regulator; 5.14—online detector assembly.

DETAILED DESCRIPTION

The anaerobic ammoxidation synergistic nitrogen removal process device of municipal sewage main and side streams and application method thereof are described below in detail in combination with FIG. 1.

An anaerobic ammoxidation synergistic nitrogen removal process device of municipal sewage main and side streams, includes a municipal sewage raw water tank 1, a biological reaction pool 2 and a secondary sedimentation pool 3; a side stream process of sewage treatment is provided with a sludge digestion solution raw water tank 4 and an AOB strengthening pool 5; the municipal sewage raw water tank 1 is an open box and is provided with an overflow pipe 1.1 and a blow-down pipe 1.2; the municipal sewage raw water tank 1 is connected to a water inlet valve 2.2 of the biological reaction pool 2 through a water inlet pump 2.1; the biological reaction pool 2 is an open pool, which is divided into a plurality of compartments, and is provided with overflowing holes in an up-and-down staggered manner as per a water flow direction to connect each compartment; a front end of the biological reaction pool is respectively provided with compartments of an anaerobic region and compartments of an anoxic region; both of the compartments of the anaerobic region and the compartments of the anoxic region are provided with a stirrer 2.12 and a stirring paddle 2.3; adjacently, the biological reaction pool is provided with compartments of an anaerobic ammoxidation region, where a fixed filler 2.4 is inoculated, the fixed filler is a PE filler and a PE sponge combined filler ball; a rear end of the biological reaction pool is provided with compartments of an aerobic region, where an aeration head 2.7 is provided; an air compressor 2.11 is connected, through a gas flowmeter 2.10 and a gas flow regulation valve 2.9, to the aeration head 2.7 disposed on a bottom of the reaction pool; the last compartment of the aerobic region reflows a sludge-water mixture to the anoxic region of the biological reaction pool through an internal reflux pump 2.5; the biological reaction pool 2 is connected to the secondary sedimentation pool 3 through a secondary sedimentation pool connection pipe 3.3; the secondary sedimentation pool 3 is a radial-flow sedimentation pool; the sedimentation pool is connected to the water inlet valve 2.2 of the biological reaction pool through a sludge reflux pump 2.6, and connected to a water inlet valve 4.1 of the AOB strengthening pool through a sludge pump 3.5; the sludge digestion solution raw water tank 4 is an open box, and is provided with an overflow pipe 4.3 and a blow-down pipe 4.4; the sludge digestion solution raw water tank 4 is connected to a water inlet valve 4.1 of a sludge digestion solution AOB strengthening pool through a water inlet pump 4.2; the sludge digestion solution AOB strengthening pool 5 is an open pool, which is divided into a plurality of compartments, and is provided with overflowing holes in an up-and-down staggered manner as per the water flow direction to connect each compartment; a front end of the sludge digestion solution AOB strengthening pool is provided with compartments of an anoxic region; the compartments of the anoxic region are provided with a stirrer 5.5 and a stirring paddle 5.6; a rear end of the sludge digestion solution AOB strengthening pool is provided with compartments of an aerobic region, where an aeration head 5.1 is provided; an air compressor 5.2 is connected, through a gas flowmeter 5.3 and a gas flow regulation valve 5.4, to the aeration head 5.1 disposed on a bottom of a reactor; the last compartment of the aerobic region is connected to the water inlet valve 4.1 of the sludge digestion solution AOB strengthening pool through an internal reflux pump 5.10; and the AOB strengthening pool 5 is connected to the anaerobic ammoxidation region of the biological pool through a pipeline 5.8 and a sludge-water mixture reflux pump 5.11.

The device is further provided with an automatic control assembly; the automatic control assembly includes online detector assembly 2.13, 5.14, a programmable PLC controller, and alkali liquor adding regulators 2.14, 5.13; the online detector assembly are in data signal connection with the programmable PLC controller; the programmable PLC controller is in control connection with the alkali liquor adding regulators; the gas flowmeters 2.10, 5.3 are respectively in data signal connection with the programmable PLC controller; the programmable PLC controller is respectively in control connection with the gas flow regulation valves 2.9, 5.4; the liquid flowmeters 2.15, 4.5 are respectively in data signal connection with the programmable PLC controller; the programmable PLC controller is in control connection with the water inlet valves 2.2, 4.1; the automatic control assembly further includes heating rods 2.16, 5.12, a temperature sensor and a temperature regulator that are disposed in the reaction pool; the temperature sensor is in data signal connection with the programmable PLC controller; the heating rods are connected to the temperature regulator; the programmable PLC controller is in control connection with the temperature regulator; the online detector assembly includes a dissolved oxygen concentration online detector, an ammonia nitrogen concentration online detector and a pH online detector that are in data signal connection with the programmable PLC controller; the automatic control assembly further includes a wireless transceiver connected to the programmable PLC controller; the wireless transceiver is in communication connection with a cloud server through a wireless network; and the cloud server is connected to a remote monitoring center or an intelligent mobile terminal through the wireless network.

A method for implementing anaerobic ammoxidation synergistic nitrogen removal of a main and side streams process by using the anaerobic ammoxidation synergistic nitrogen removal process device of municipal sewage main and side streams provided by the present disclosure includes the following steps.

1) activated sludge with nitrification which is taken from an aeration pool of a municipal sewage plant is added to the biological reaction pool and the municipal sewage secondary sedimentation pool, and a fixed filler adhered with an anaerobic ammonia-oxidizing bacteria is inoculated to an anaerobic ammoxidation region of the biological reaction pool, the activated sludge having a concentration MLSS of 3000-4000 mg/L after the sludge is inoculated; municipal sewage raw water is added to the municipal sewage raw water tank and the water inlet pump 2.1 of the biological reaction pool is started, such that the municipal sewage raw water enters the biological reaction pool through the water inlet valve 2.2 of the biological reaction pool; stirrers 2.12 and air compressors 2.11 in compartments of anaerobic and anoxic regions in the open pool of the biological reaction pool are started, each compartment in the aerobic region having an aeration amount of 30-50 mL/min, and stirrers in the anaerobic region and the anoxic region having a rotational speed of 90-110 r/min, and the gas flow regulation valve 2.9 is regulated such that DO in the aerobic region of the biological reaction pool is 0.3-0.8 mg/L; the municipal sewage sludge reflux pump 2.6 and the internal reflux pump 2.5 are started, a sludge reflux ratio being 50-100%, and an internal reflux ratio being 100-300%;

2) activated sludge with nitrification which is taken from the aeration pool of the municipal sewage plant is added to a sludge digestion solution AOB strengthening pool, the activated sludge having a concentration MLSS of 3000-4000 mg/L after the sludge is inoculated; a sludge digestion solution is added to the sludge digestion solution raw water tank and the water inlet pump 4.2 of the sludge digestion solution raw water tank is started, such that the sludge digestion solution enters the sludge digestion solution AOB strengthening pool through the water outlet valve 4.1 of the digestion solution raw water tank; the stirrer and the air compressor in a compartment of an anoxic region in the open pool of the sludge digestion solution AOB strengthening pool are started, each compartment in an aerobic region having an aeration amount of 30-50 mL/min, and the stirrer in the anoxic region having a rotational speed of 90-110 r/min, and the gas flow regulation valve 5.4 is regulated such that dissolved oxygen DO in the aerobic region of the sludge digestion solution AOB strengthening pool is 0.5-1.0 mg/L; and in case of COD>60 mg/L in water of the anoxic region, the sludge digestion solution internal reflux pump is started, an internal reflux ratio being 50-250%;

3) the sludge-water mixture reflux pump is switched on, and a sludge-water mixture generated by the sludge digestion solution AOB strengthening pool is added to the compartment in the anaerobic ammoxidation region of the biological reaction pool;

4) according to the water quality of the sludge digestion solution, and the pH value and temperature of the mixed solution in the sludge digestion solution AOB strengthening pool, a $NH_4^+$—N load of inflow is regulated, i.e., a water inflow is regulated and a sludge reflux ratio is changed, in case of the concentration of FA is high, the sludge reflux ratio is increased, and in case of the concentration of FNA is high, the sludge reflux ratio is reduced;

5) a $NH_4^+$—N concentration of effluent of the sludge digestion solution AOB strengthening pool is maintained to be smaller than 30 mg/L, and in a case where the $NH_4^+$—N concentration of the effluent is greater than 30 mg/L, an hydraulic retention time HRT is improved to reduce the $NH_4^+$—N concentration of the effluent.

Hereinafter, the sewage treatment plant of a city is used as an example to describe the technical effects of the present disclosure in detail.

The effluent from primary sedimentation pool and digested sludge dehydration solution of the sewage treatment plant in a city. The effluent from the primary sedimentation pool has the following water quality: the COD was 106.1-182.4 mg/L, the $NH_4^+$—N was 40.24-64.97 mg/L, the $NO_2$—N was 0.00-1.12 mg/L, the $NO_3^-$—N was 0.11-1.19 mg/L; the SS was 60-138 mg/L; the TP was 3.13-8.31 mg/L;

the alkalinity was 247-405 mg/L; and the pH was 7.02-7.58. The sludge dehydration solution has the following water quality: the COD was 78-249 mg/L; the $NH_4^+$—N was 132-315 mg/L; $NO_2$—N≤1.5 mg/L, the $NO_3$—N was below detection limit, the TP was 7.4-32.9 mg/L, the alkalinity was 854-1587 mg/L, and the pH was 6.93-8.67.

It is showed by the experiments that: after stable operation, the effluent of the municipal sewage has COD<35 mg/L and TN of 8.5-12.75 mg/L, the maximum $NH_4^+$—N removal load of the sludge digestion solution AOB strengthening pool is 1.0 $kgN/m^3 \cdot d$, the $NH_4^+$—N concentration in the effluent is <30 mg/L, and the COD in the effluent is 49-68 mg/L.

The description on the embodiments is convenient for those of ordinary skill in the art to understand and apply the present disclosure. It is apparent that those skilled in the art can make various modifications on these embodiments easily and apply the general principles described here to other embodiments without creative efforts. Therefore, the present disclosure is not limited to the described embodiments. Any improvement and modification made by those skilled in the art according to the revelation of the present disclosure and without departing from the scope of the present disclosure should be included in the protection scope of the present disclosure.

What is claimed is:

1. An anaerobic ammoxidation synergistic nitrogen removal process device of municipal sewage main and side streams, characterized in that, a process device of sewage main stream treatment is provided with a municipal sewage raw water tank, a biological reaction pool and a secondary sedimentation pool; a process device of sewage side stream treatment is provided with a sludge digestion solution raw water tank and an ammonia oxidizing bacteria (AOB) strengthening pool; the municipal sewage raw water tank is an open box and is provided with an overflow pipe and a blow-down pipe; the municipal sewage raw water tank is connected to a first water inlet valve of the biological reaction pool through a first water inlet pump; the biological reaction pool is an open pool, which is divided into a plurality of compartments, and is provided with holes in an up-and-down staggered manner as per a water flow direction to connect each compartment; a front end of the biological reaction pool is sequentially provided with an anaerobic region divided into a plurality of anaerobic compartments and an anoxic region divided into a plurality of anoxic compartments; each of the anaerobic compartment and each of the anoxic compartment are provided with a stirrer and a stirring paddle; adjacent to the front end of the biological reaction pool, the biological reaction pool is provided with an anaerobic ammoxidation region divided into a plurality of anaerobic ammoxidation compartments, in each anaerobic ammoxidation compartment, a fixed filler is placed, the fixed filler is a PE filler and a polyethene (PE) sponge combined filler ball; a rear end of the biological reaction pool is provided with an aerobic region divided into a plurality of aerobic compartments, in each aerobic compartment an aeration head is provided; an air compressor is connected, through a first gas flowmeter and a first gas flow regulation valve, to the aeration head disposed on a bottom of the biological reaction pool; the last aerobic compartment reflows a sludge-water mixture to the anoxic region of the biological reaction pool through an internal reflux pump; the biological reaction pool is connected to the secondary sedimentation pool through a secondary sedimentation pool connection pipe; the secondary sedimentation pool is a radial-flow sedimentation pool; the sedimentation pool is connected to the first water inlet valve of the biological reaction pool through a sludge reflux pump, and connected to a second water inlet valve of the AOB strengthening pool through a sludge pump; the sludge digestion solution raw water tank is an open box, and is provided with an overflow pipe and a blow-down pipe; the sludge digestion solution raw water tank is connected to a second water inlet valve of a sludge digestion solution AOB strengthening pool through a second water inlet pump; the sludge digestion solution AOB strengthening pool is an open pool, which is divided into a plurality of compartments, and is provided with holes in an up-and-down staggered manner as per the water flow direction to connect each compartment; a front end of the sludge digestion solution AOB strengthening pool is provided with an anoxic region divided into a plurality of anoxic compartments; each of the anoxic compartment is provided with a stirrer and a stirring paddle; a rear end of the sludge digestion solution AOB strengthening pool is provided with an aerobic region divided into a plurality of aerobic compartments, in each aerobic compartment an aeration head is provided; an air compressor is connected, through a second gas flowmeter and a second gas flow regulation valve, to the aeration head disposed on a bottom of a reactor; the last aerobic compartment is connected to the second water inlet valve of the sludge digestion solution AOB strengthening pool through an internal reflux pump; the AOB strengthening pool is connected to the anaerobic ammoxidation region of the biological reaction pool through a pipeline and a sludge-water mixture reflux pump.

2. The anaerobic ammoxidation synergistic nitrogen removal process device of municipal sewage main and side streams according to claim 1, characterized in that, the device is further provided with an automatic control assembly; the automatic control assembly includes a first online detector assembly, a second online detector assembly, a programmable PLC controller, a first alkali liquor adding regulator and a second alkali liquor adding regulator; the first online detector assembly and the second online detector assembly are in data signal connection with the programmable PLC controller; the programmable PLC controller is in control connection with the first alkali liquor adding regulator and the second alkali liquor adding regulator; the first gas flowmeter and the second gas flowmeter are respectively in data signal connection with the programmable PLC controller; the programmable PLC controller is respectively in control connection with the first gas flow regulation valve and the second gas flow regulation valve; a first liquid flowmeter and a second liquid flowmeter are respectively in data signal connection with the programmable PLC controller; the programmable PLC controller is in control connection with the first water inlet valve and the second water inlet valve; the automatic control assembly further includes a first heating rod and a second heating rod, a temperature sensor and a temperature regulator that are disposed in the biological reaction pool; the temperature sensor is in data signal connection with the programmable PLC controller; the first and second heating rods are connected to the temperature regulator; the programmable PLC controller is in control connection with the temperature regulator; the first online detector assembly and the second online detector assembly each respectively include a dissolved oxygen concentration online detector, an ammonia nitrogen concentration online detector and a pH online detector that are in data signal connection with the programmable PLC controller; the automatic control assembly further includes a wireless transceiver connected to the programmable PLC controller; the wireless transceiver is in communication connection with a cloud server through a wireless network; and the cloud server is connected to a remote monitoring center or an intelligent mobile terminal through the wireless network.

3. A method for implementing anaerobic ammoxidation synergistic nitrogen removal of a main and side streams process, using the anaerobic ammoxidation synergistic nitrogen removal process device of municipal sewage main and side streams according to claim 2, characterized in that, the method includes the following steps:
1) activated sludge with nitrification which is taken from an aeration pool of a municipal sewage plant is added to the biological reaction pool and the municipal sewage secondary sedimentation pool, and a fixed filler adhered with an anaerobic ammonia-oxidizing bacteria is inoculated to anaerobic ammoxidation region of the biological reaction pool, the activated sludge having a concentration MLSS of 3000-4000 mg/L after the sludge is inoculated; municipal sewage raw water is added to the raw water tank and the first water inlet pump is started, such that the municipal sewage raw water enters the biological reaction pool through the first water inlet valve of the municipal sewage biological reaction pool; stirrers and air compressors in anaerobic and anoxic regions are started, each compartment in the aerobic region having an aeration amount of 30-50 mL/min, and stirrers in the anaerobic region and the anoxic region having a rotational speed of 90-110 r/min, and the first gas flow regulation valve is regulated such that dissolved oxygen DO in the aerobic region is 0.3-0.8 mg/L; the municipal sewage sludge reflux pump and the internal reflux pump are started, a sludge reflux ratio being 50-100%, and an internal reflux ratio being 100-300%; the first heating rod is switched on, in order to control the temperature of the mixed solution in the reaction pool of the device at 30-35° C.; the alkali liquor adding regulator is switched on, in order to control the pH value of the device at 7.8-8.3;
2) activated sludge with a nitrification effect which is taken from the aeration pool of the municipal sewage plant is added to the sludge digestion solution AOB strengthening pool, the activated sludge having a concentration MLSS of 3000-4000 mg/L after the sludge is inoculated; a sludge digestion solution is added to the raw water tank and the second water inlet pump is started, such that the sludge digestion solution enters the AOB strengthening pool through the water inlet valve of the sludge digestion solution AOB strengthening pool; the stirrer and the air compressor in the anoxic region are started, each compartment in the aerobic region having an aeration amount of 30-50 mL/min, and stirrers in the anoxic region having a rotational speed of 90-110 r/min, the second gas flow regulation valve is regulated such that dissolved oxygen DO in the aerobic region is 0.5-1.0 mg/L; and in case of COD>60 mg/L in water of the anoxic region, the sludge digestion solution internal reflux pump is started, an internal reflux ratio being 50-250%; the second heating rod is switched on, in order to control the temperature of the mixed solution in the reaction pool of the device at 30-35° C.; an alkali liquor adding regulator is switched on, in order to control the pH value of the device at 7.8-8.3;
3) the sludge-water mixture reflux pump is switched on, and the sludge-water mixture generated by the sludge digestion solution AOB strengthening pool is added to the anaerobic ammoxidation region of the biological reaction pool;
4) according to the water quality of the sludge digestion solution, and the pH value and temperature of the mixed solution in the sludge digestion solution AOB strengthening pool, a $NH_4^+$—N load of inflow is regulated, in case of the concentration of free ammonia FA is high, the sludge reflux ratio is increased, and in case of the concentration of free nitrite acid FNA is high, the sludge reflux ratio is reduced;
5) a $NH_4^+$—N concentration of effluent of the sludge digestion solution AOB strengthening pool is maintained to be smaller than 30 mg/L, in a case of the $NH_4^+$—N concentration of the effluent is greater than 30 mg/L, a hydraulic retention time (HRT) is increased, i.e., water inflow is reduced, to reduce the $NH_4^+$—N concentration of the effluent.

* * * * *